P. McDOWALL.
APPARATUS FOR COALING VESSELS AT SEA.
APPLICATION FILED NOV. 22, 1909.

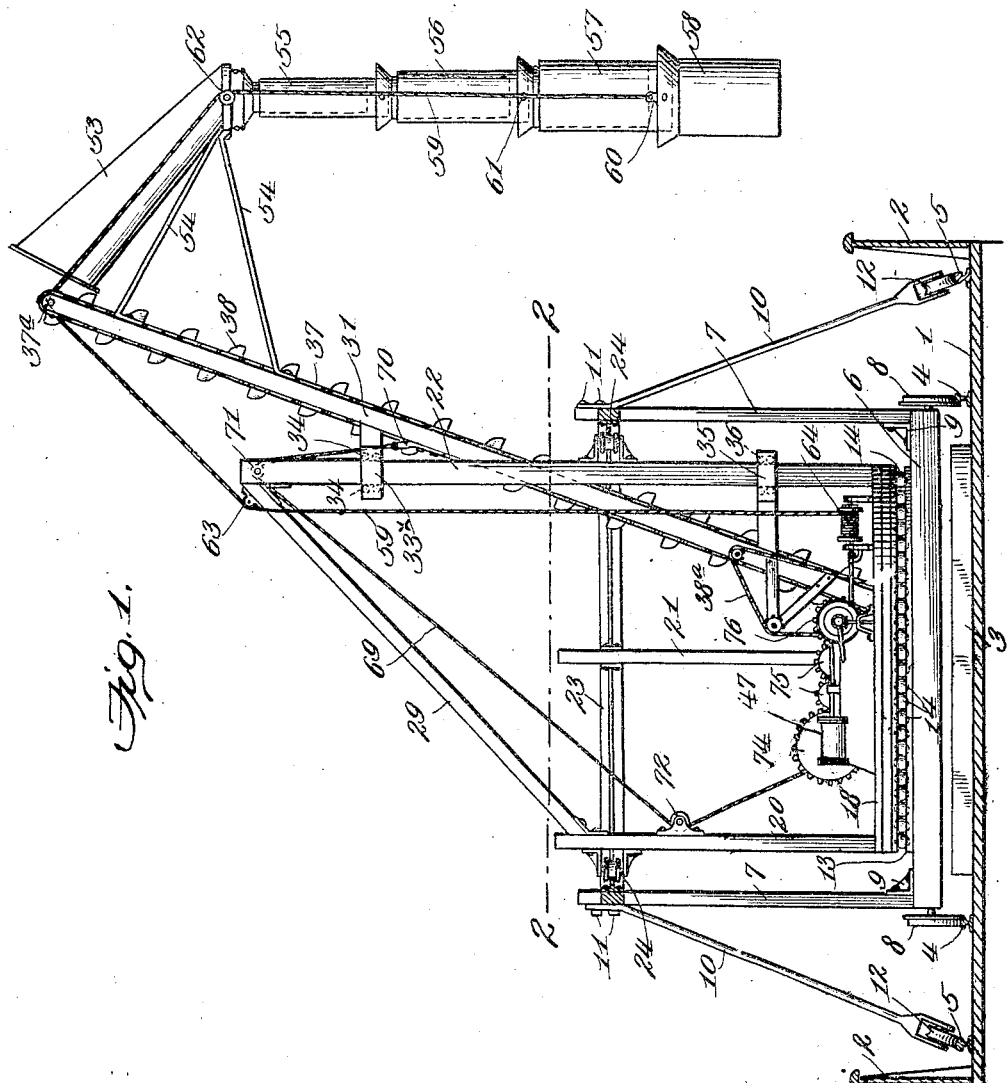

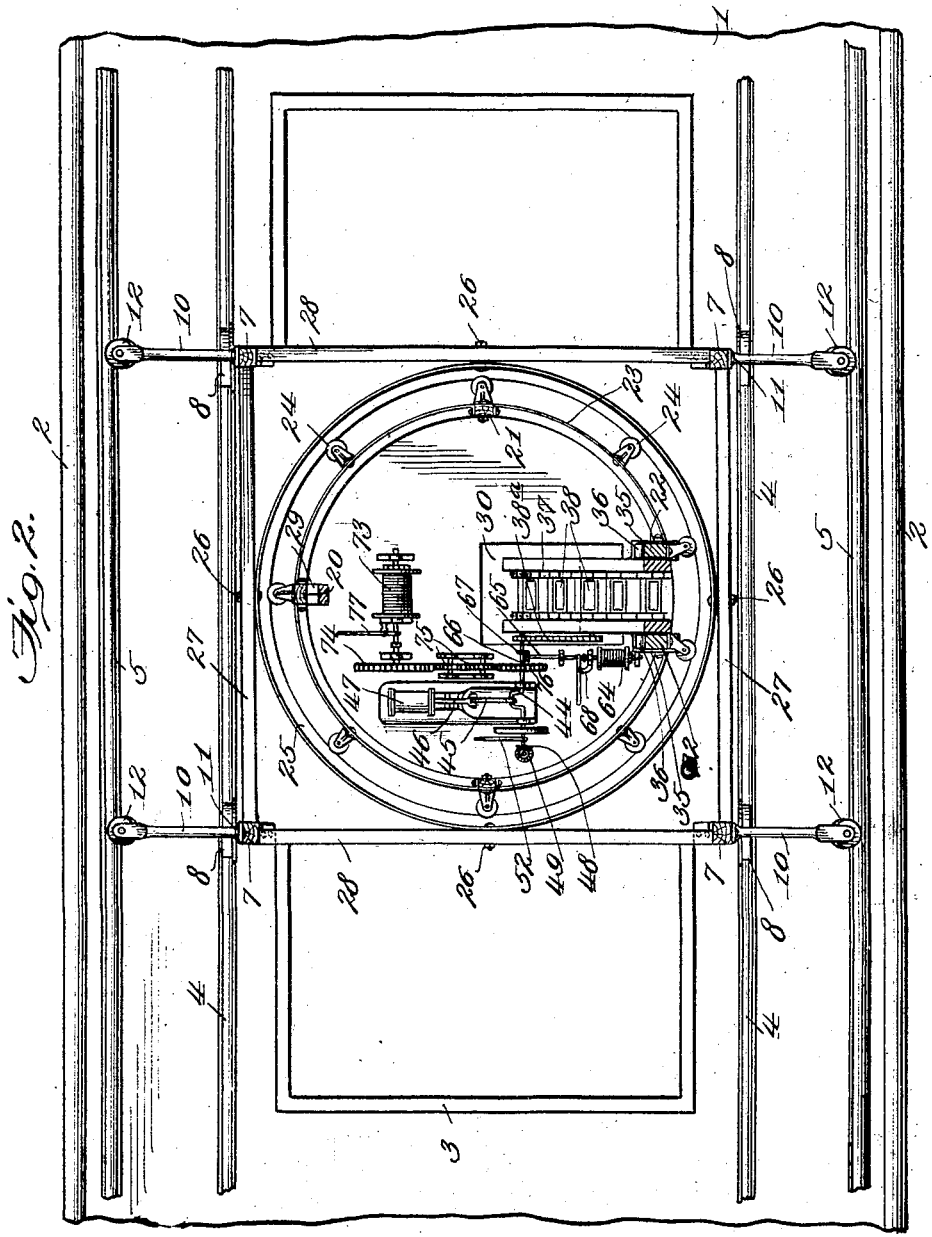

977,464.

Patented Dec. 6, 1910.
3 SHEETS—SHEET 3.

Witnesses:

Inventor
Peter McDowall
By
Atty

UNITED STATES PATENT OFFICE.

PETER McDOWALL, OF WEST CONCORD, NEW HAMPSHIRE, ASSIGNOR OF ONE-HALF TO CHESTER L. PIPER, OF WEST CONCORD, NEW HAMPSHIRE.

APPARATUS FOR COALING VESSELS AT SEA.

977,464.   Specification of Letters Patent.   Patented Dec. 6, 1910.

Application filed November 22, 1909. Serial No. 529,428.

*To all whom it may concern:*

Be it known that I, PETER McDOWALL, a subject of the King of Great Britain, residing at West Concord, in the county of Merrimack and State of New Hampshire, have invented certain new and useful Improvements in Apparatus for Coaling Vessels at Sea, of which the following is a specification.

This invention relates to mechanism for coaling vessels at sea, and one of the principal objects of the invention is to provide reliable and efficient means for conveying coal from the hold of a collier to the hold of a vessel lashed to the collier and lying alongside of the same.

Another object of the invention is to provide a carriage having wheels mounted upon tracks at the sides of the hatchway of the collier and a turntable mounted upon said carriage, said turntable carrying an endless conveyer and a telescopic chute; means being provided for rotating the turntable to discharge coal at any point radially from the center of the hold of the collier.

Still another object of the invention is to provide a carriage longitudinally movable over the hatchway of the collier, a rotatable turntable mounted on the carriage, an endless conveyer adjustable on the turntable to extend any required distance in the hold, said conveyer carrying at its upper end a telescopic chute comprising a series of members connected together, and means for operating the conveyer and the chute at the will of an operator.

Another object of the invention is to provide reliable and efficient means for coaling vessels at sea, which will not be rendered inoperative in rough weather and which will be provided with means to continuously discharge the coal from the collier to the vessel while they are both lashed together and under way.

These and other objects may be attained by means of the construction illustrated in the accompanying drawing, in which—

Figure 4:
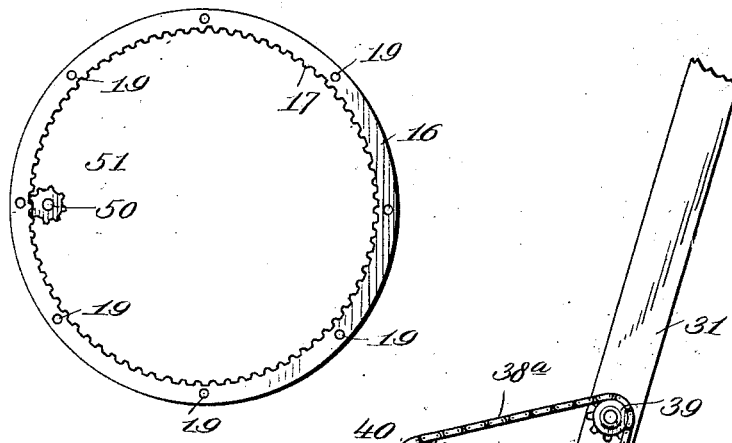
Figure 3:
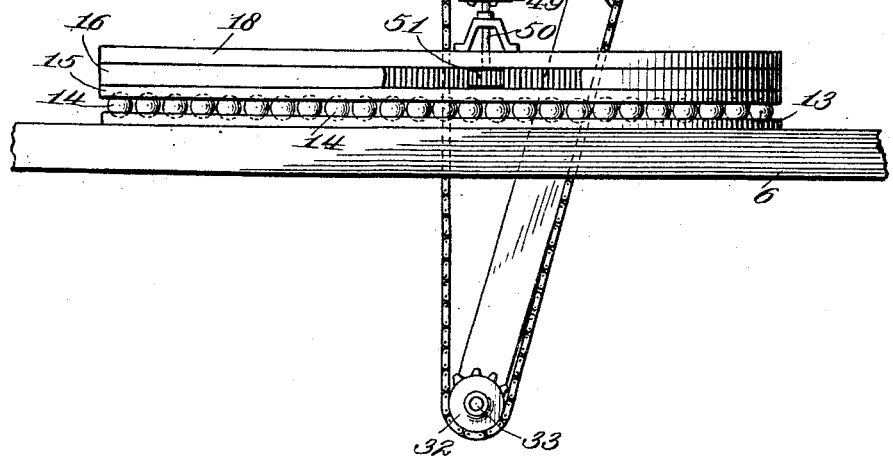

Figure 1 is a side elevation and partial vertical section of an apparatus made in accordance with my invention. Fig. 2 is a horizontal sectional view taken on the line 2—2 of Fig. 1, looking down. Fig. 3 is an enlarged side elevation of the mechanism for operating the conveyer and for rotating the turntable. Fig. 4 is a top plan view of the pinion and ring for rotating the turntable.

Referring to the drawings the numeral 1 designates a deck of a collier, 2 are the bulwarks and 3 a hatchway leading to the hold. Secured to the deck 1 of the collier at opposite sides of the hatchway 3 is a rail or track 4. Rails 5 are also secured to the deck 1 at points adjacent to the bulwarks 2. A carriage 6 of rectangular form provided with suitable uprights 7 connected to the base or truck members, is provided with wheels 8, adapted to run upon the track rails 4. The uprights 7 are braced to the truck by corner braces 9 at the lower ends of said uprights, while at the upper ends diagonal braces 10 are bolted at 11, the lower ends of said braces being provided with grooved wheels 12 journaled in the bifurcated lower ends of said diagonal braces, said wheels being adapted to run upon the rails 5 and to serve to brace the carriage and prevent the same from tipping in use.

Mounted upon the carriage 6 is a ball bearing ring 13 provided with an annular groove, in which bearing balls 14 are mounted. Supported upon the balls 14 is a bearing ring 15 also provided with an annular groove in which the balls 14 are adapted to run. Secured to the ring 15 is an interiorly cogged ring or annulus 16 provided with interior cogged teeth 17 for a purpose which will presently be explained. The ring 16 has secured to its upper side a brace ring 18. These three rings 15, 16, and 18 are secured together by means of bolts extending through registering holes in each of the rings. As shown in Fig. 4 bolt holes 19 are formed in the ring 16 and similar holes are formed in the rings 15 and 18. Connected in any suitable manner to these rings are uprights 20 and 21. Also supported upon the rings is a pair of standards 22 spaced apart a sufficient distance to permit the conveyer to pass between them. Connected to the uprights 20 and 21 and to the standards 22 is a pair of circular brace members 23 which are spaced apart, and journaled between said braces at intervals around the same are grooved rollers 24, said rollers running upon the circular track 25 bolted at 26 to side bars 27 and end bars 28 secured to the uprights 7 of the carriage. The standards 22 are braced from the uprights 20 by means of a diagonal brace 29. The turntable is provided with a suitable opening 30 which leads into the hold of the collier.

The endless conveyer comprises rails 31 suitably spaced apart and provided at their lower ends with a sprocket wheel 32 journaled upon an extended shaft 33. Secured to the rails 31 are bearing members 33ˣ provided with suitable anti-friction rollers 34 adapted to run upon the standards 22. At a point low down upon the rails 31 is a similar bearing member 35 also provided with anti-friction rollers 36 adapted to bear upon the sides of the standards 22. The endless conveyer 37 is provided with suitable buckets 38, said conveyer passing around a suitable roller upon the shaft 33 at the lower end of the rails 31 and around a similar roller mounted upon the shaft 37ᵃ at the top of the rails 31. The endless conveyer is operated by means of an endless chain 38ᵃ passing around an idler sprocket wheel 39 on one of the rails 31 and an idler sprocket 40 mounted upon a frame 41 extending outward from one of the rails 31. The chain 38 also passes around a sprocket 32 at the lower ends of the rail 31, which operates the lower roller for the conveyer. This chain is operated by means of a sprocket wheel 42 secured to the shaft 43 provided with a cranked portion 44, to which is attached the connecting rod 45 leading from the piston 46 of a suitable motor or engine 47, supported upon the turntable. The shaft 43 is provided with a beveled gear 48 adapted to mesh with a similar gear 49 mounted upon a vertical shaft 50, said shaft carrying a pinion 51 which meshes with the teeth 17 of the annulus 16 for rotating the turntable. A suitable clutch operated by the lever 52 is utilized for throwing the beveled gears 48 and 49 into and out of mesh when desired.

Connected to the upper end of the conveyer rails 31 is a chute comprising a flaring receiver 53 connected by means of suitable braces 54 to said conveyer rails. The receiver 53 is disposed in an inclined position and connected to the lower end thereof is one of the sections 55 of a flexible telescopic chute. Connected to the section 55 is a similar but larger section 56. Connected to the section 56 is a similar section 57 of larger size and this chute is made up in this way of any suitable number of sections connected in any suitable manner to render the entire chute flexible and the sections telescopic to thus allow for the varying movements of the vessel and to change the direction of the coal flowing through said chute. At the lower end of the chute is a similar section 58 of still larger size, thus permitting the sections to be telescoped, one within the other. For telescoping this chute a cable 59 is connected to a bracket 60 on the lower section 58, said cable passing through an eye 61 on the adjacent section 57 and over a roller 62 on the receiver 53. The cable thence extends over a roller on one of the conveyer rails, over a roller 63 on the braces 29 and thence extends downward to a winding drum 64 supported upon the turntable. The winding drum 64 is provided with an extended shaft 65 operated by means of a beveled gear 66 adapted to be thrown into mesh with a similar gear 67 on the shaft 43 by means of a suitable clutch 68.

For raising and lowering the conveyer a cable 69 is connected to the rails 31 by means of a suitable bracket 70, said cable passing over the roller 71 journaled between the standards 22 at their upper ends, said cable extending down around a pulley 72 on one of the uprights 20 and from thence to the cable extending around a windlass or winding drum 73 provided with a shaft having a large gear wheel 74 thereon, said gear wheel meshing with gears 75 which mesh with a gear wheel 76 on the shaft 43. The gear wheel 74 may be thrown into and out of mesh with one of the gears 75 by means of a suitable clutch 77.

The operation of the invention may be briefly described as follows: The vessel to be loaded with coal is lashed at the side of the collier and if desired the collier and the vessel may be under way when the transfer of coal is made. The lower end of the chute is inserted in the hold of the vessel and the motor 47 is started to take the coal from the hold of the collier and carry it up by means of the conveyer and discharge it into the receiver 53, from which it falls by gravity through the chute into the hold of the vessel. The chute being flexible and telescopic will allow for the rising and falling of the vessel relatively to the collier.

In order to discharge the coal at different points in the hold, the turntable may be operated by means of the clutch to turn the table and swing the chute whenever required. As the hold of the vessel becomes more filled with coal, the chute is raised by means of the cable 59 and the winding drum 64. When it is desired to move the chute longitudinally of the vessel, the carriage is pushed upon the track rails 4 and 5.

From the foregoing it will be obvious that an apparatus made in accordance with my invention can be used for coaling vessels at sea even in comparatively rough weather and provision is made for permitting the collier and vessel to move together if desired to save time in coaling.

The invention is comparatively simple in construction and is provided with means for operating the same which can be quickly thrown into and out of operation whenever required, is strong, durable and efficient in use and can be built at comparatively low cost.

Having thus fully described the invention what is claimed as new is:

1. In an apparatus for coaling vessels at sea, a track, a carriage mounted on said track, diagonal braces connected to said carriage, grooved wheels journaled to said braces, tracks on which said wheels are mounted to run, a turn-table mounted to rotate on said carriage, mechanism for rotating said turn-table, a conveyer adjustably mounted on said turn-table, and mechanism for adjusting said conveyer.

2. In an apparatus of the character described, a carriage mounted upon a track and provided with a series of uprights, side and end bars secured to said uprights, a circular track secured to said bars, a turn-table provided with uprights, a circular brace member connected to said uprights and rollers mounted on said circular brace to engage the circular track, said turntable mounted to rotate on said carriage.

3. In an apparatus of the character described, a carriage provided with wheels and mounted to move on rails, said carriage provided with uprights, a turntable mounted to rotate on said carriage, said turntable provided with uprights, grooved rollers mounted on the uprights of the turntable, a circular track mounted on the uprights of the carriage, and diagonal braces provided with grooved rollers at their lower ends bearing upon tracks at the sides of the carriage.

In testimony whereof I affix my signature in presence of two witnesses.

PETER McDOWALL.

Witnesses:
AGNES J. MURCHIE,
ALEXANDER MURCHIE.